United States Patent
Alford et al.

(10) Patent No.: US 7,052,235 B2
(45) Date of Patent: May 30, 2006

(54) TURBINE ENGINE SHROUD SEGMENT, HANGER AND ASSEMBLY

(75) Inventors: Mary Ellen Alford, Cincinnati, OH (US); David Edward Bulman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 105 days.

(21) Appl. No.: 10/863,434

(22) Filed: Jun. 8, 2004

(65) Prior Publication Data

US 2005/0271505 A1  Dec. 8, 2005

(51) Int. Cl.
F01D 25/28 (2006.01)

(52) U.S. Cl. .................................. 415/173.1
(58) Field of Classification Search ............. 415/173.1, 415/173.3, 136, 138, 139; 416/193 A, 248, 416/219 R, 220 R
See application file for complete search history.

(56) References Cited

U.S. PATENT DOCUMENTS

| | | | |
|---|---|---|---|
| 3,085,398 A | 4/1963 | Ingelson | 415/189 |
| 3,807,891 A | 4/1974 | McDow et al. | 415/134 |
| 3,813,185 A * | 5/1974 | Bouiller et al. | 416/198 R |
| 3,966,353 A | 6/1976 | Booher, Jr. et al. | 415/116 |
| 4,050,843 A | 9/1977 | Needham et al. | 415/136 |
| 5,071,313 A | 12/1991 | Nichols | 415/173 |
| 5,127,793 A | 7/1992 | Walker et al. | 415/173 |
| 5,228,828 A | 7/1993 | Damlis et al. | 415/713 |
| 5,441,385 A | 8/1995 | Boyd et al. | 415/209 |
| 5,480,281 A | 1/1996 | Correia | |
| 5,562,408 A | 10/1996 | Proctor et al. | 415/177 |
| 5,591,003 A | 1/1997 | Boyd et al. | 415/209 |
| 6,315,519 B1 | 11/2001 | Bagepalli et al. | 415/136 |
| 6,435,824 B1 | 8/2002 | Schell et al. | 415/200 |
| 6,702,550 B1 | 3/2004 | Darkins, Jr. et al. | 415/116 |
| 6,821,085 B1 * | 11/2004 | Darkins, Jr. et al. | 415/173.1 |
| 2003/0185674 A1 | 10/2003 | Alford et al. | |

OTHER PUBLICATIONS

Co-Pending U.S. Appl. No. 10/260,478 Filed Sep. 30, 2002 (GE 13DV13749).

* cited by examiner

Primary Examiner—Edward K. Look
Assistant Examiner—Nathan Wiehe
(74) Attorney, Agent, or Firm—David L. Narciso; Lee H. Sachs

(57) ABSTRACT

A turbine engine shroud segment comprises a body including an outer surface from and along which a segment projection extends away from and in an axial direction. The segment projection includes circumferentially spaced apart segment support surfaces. A shroud hanger comprises a body including an inner surface from and along which a hanger projection extends in an axial direction. The hanger projection includes circumferentially spaced hanger bearing surfaces. In a circumferential turbine engine shroud assembly of shroud segments and hangers, a shroud hanger is assembled between a pair of adjacent shroud segments separated by an axial interface. The hanger projection is in juxtaposition with the interface, and respective segment support surfaces and hanger bearing surfaces are in registry.

16 Claims, 5 Drawing Sheets

TURBINE ENGINE SHROUD SEGMENT, HANGER AND ASSEMBLY

The Government may have certain rights in this invention pursuant to Contract No. F33615-97-C-2778 awarded by the Department of Air Force.

BACKGROUND OF THE INVENTION

This invention relates generally to turbine engine shroud segments, segment hangers, and shroud assemblies including a surface exposed to elevated temperature engine gas flow. More particularly, it relates to gas turbine engine shroud segments, for example used in the turbine section of a gas turbine engine, and made of a low ductility material.

A plurality of gas turbine engine stationary shroud segments are assembled circumferentially about an axial flow engine axis and about, typically radially outwardly of, rotating blading members, for example about turbine blades. Such assembly of shroud segments defines a part of the radial outer flowpath boundary over the blades. As has been described in various forms in the gas turbine engine art, it is desirable to maintain the operating clearance between the tips of the rotating blades and the cooperating, juxtaposed surface of the stationary shroud segments as close as possible to enhance engine operating efficiency. Typical examples of printed material relating to turbine engine shrouds and such shroud clearance include U.S. Pat. No. 5,071,313—Nichols; U.S. Pat. No. 5,074,748—Hagle; U.S. Pat. No. 5,127,793—Walker et al.; and U.S. Pat. No. 5,562,408—Proctor et al.; and U.S. Patent Application Publications 2003/0133790 A1—Darkins, Jr. et al, and 2003/0185674 A1—Alford et al.

In its function as a flowpath component, the shroud segment, carried in an assembly with the shroud hanger, must be capable of meeting the design life requirements selected for use in a designed engine operating temperature and pressure environment. To enable current materials to operate effectively as shroud segments in the strenuous temperature and pressure conditions as exist in the turbine section flowpath of modern gas turbine engines, it has been a practice to provide cooling air to a portion of the shroud segment away from the engine flowpath. Examples of typical cooling arrangements are described in some of the above-identified patents.

The radially inner or flow path surfaces of shroud segments in a gas turbine engine shroud assembly about rotating blades are arced circumferentially to define a flowpath annular surface about the rotating tips of the blades. Such annular surface is the sealing surface for the turbine blade tips. Since the shroud is a primary element in a turbine blade clearance control system, minimizing shroud deflection and maintaining shroud inner surface arc or "roundness" during operation of a gas turbine engine assists in minimizing performance penalty to an engine cycle. Several operating conditions tend to distort such roundness.

One condition is the application of cooling air to the outer portion of a shroud segment, creating in the shroud segment a thermal gradient or differential between the inner shroud surface exposed to a relatively high operating gas flow temperature and the cooled outer surface. One result of such thermal gradient is a form of shroud segment deformation or deflection generally referred to as "chording". At least the radially inner or flowpath surface of a shroud and its segments are arced circumferentially to define a flowpath annular surface about the rotating tips of the blades. The thermal gradient between the inner and outer faces of the shroud, resulting from cooling air impingement on the outer surface, causes the arc of the shroud segments to chord or tend to straighten out circumferentially. As a result of chording, the circumferential end portions of the inner surface of the shroud segment tend to move radially outwardly in respect to the middle portion of the segment.

In addition to thermal distorting forces generated by such thermal gradient are distorting fluid pressure forces, acting on the shroud segment. Such forces result from a fluid pressure differential between the higher pressure cooling air on the shroud segment radial outer surface and the axially decreasing lower pressure engine flowstream on the shroud radially inner surface. With the cooling air maintained at a substantially constant pressure on the shroud radially outer surface during engine operation, such fluid pressure differential on a shroud segment increases axially downstream through the engine in a turbine section as the turbine extracts power from the gas stream. This action reduces the flow stream pressure progressively downstream. Such pressure differential tends to force the axial end portions of a shroud segment, more so the axially aft or downstream portion, toward the engine flowpath. Therefore, a complex array of forces and pressures act to distort and apply pressures to a turbine engine shroud segment during engine operation to change the roundness of the arced shroud segment assembly radially inner surface. It is desirable in the design of such a turbine engine shroud and shroud assembly to compensate for such forces and pressures acting to deflect or distort the shroud segment.

Metallic type materials currently and typically used as shrouds and shroud segments have mechanical properties including strength and ductility sufficiently high to enable the shrouds to be restrained against such deflection or distortion resulting from thermal gradients and pressure differential forces. Examples of such restraint include the well known side rail type of structure, or the C-clip type of sealing structure, for example described in the above identified Walker et al patent. That kind of restraint and sealing results in application of a compressive force at least to one end of the shroud to inhibit chording or other distortion.

Current gas turbine engine development has suggested, for use in higher temperature applications such as shroud segments and other components, certain materials having a higher temperature capability than the metallic type materials currently in use. However such materials, forms of which are referred to commercially as a ceramic matrix composite (CMC), have mechanical properties that must be considered during design and application of an article such as a shroud segment. For example, as discussed below, CMC type materials have relatively low tensile ductility or low strain to failure when compared with metallic materials. Also, CMC type materials have a coefficient of thermal expansion (CTE) in the range of about 1.5–5 microinch/inch/° F., significantly different from commercial metal alloys used as restraining supports or hangers for metallic shrouds and desired to be used with CMC materials. Such metal alloys typically have a CTE in the range of about 7–10 microinch/inch/° F. Therefore, if a CMC type of shroud segment is restrained and cooled on one surface during operation, forces can be developed in CMC type segment sufficient to cause failure of the segment.

Generally, commercially available CMC materials include a ceramic type fiber for example SiC, forms of which are coated with a compliant material such as BN. The fibers are carried in a ceramic type matrix, one form of which is SiC. Typically, CMC type materials have a room temperature tensile ductility of no greater than about 1%, herein used to define and mean a low tensile ductility material. Generally CMC type materials have a room temperature tensile ductility in the range of about 0.4–0.7%. This is compared with metallic shroud and/or supporting structure or hanger materials having a room temperature tensile ductility of at least about 5%, for example in the range of about 5–15%. Shroud segments made from CMC type materials, although having certain higher temperature capabilities than those of a metallic type material, cannot tolerate the above described and currently used type of compressive force or similar restraint force against chording and other deflection or distortion. Neither can they withstand a stress rising type of feature, for example one provided at a relatively small bent or filleted surface area, without sustaining damage or fracture typically experienced by ceramic type materials. Furthermore, manufacture of articles from CMC materials limits the bending of the SiC fibers about such a relatively tight fillet to avoid fracture of the relatively brittle ceramic type fibers in the ceramic matrix. Provision of a shroud segment of such a low ductility material, particularly in combination or assembly with a shroud hanger that supports and carries the segment without application of excessive pressure to the segment, with appropriate surfaces for sealing of edge portions from leakage thereabout, would enable advantageous use of the higher temperature capability of CMC material for that purpose.

BRIEF SUMMARY OF THE INVENTION

A form of the present invention is a turbine engine shroud segment, for example for use in a turbine engine shroud assembly with a shroud hanger, comprising a shroud segment body including spaced apart inner and outer surfaces between spaced apart segment body first and second axial and first and second circumferential edge portions. For carrying the shroud segment body, the shroud segment includes a shroud segment projection integral with and extending in a direction away from the segment body outer surface. According to such form of the invention, the shroud segment projection extends axially along at least a portion of the shroud segment body outer surface between the segment body first and second axial edge portions and spaced apart from the segment body first and second circumferential edge portions. The shroud segment projection comprises at least first and second circumferentially spaced apart shroud segment support surfaces of selected support surface shape and facing toward the segment body outer surface. The first shroud segment support surface faces toward the segment body first circumferential edge portion and the second shroud segment support surface faces toward the segment body second circumferential edge portion opposed to the first shroud segment support surface.

Another form of the present invention is turbine engine shroud segment hanger for supporting a shroud segment in a turbine engine shroud assembly. The hanger comprises a hanger body including spaced apart hanger body inner and outer surfaces between spaced apart hanger body first and second axial edge portions and first and second circumferential edge portions. The hanger includes a hanger projection that extends axially along at least a portion of the hanger body inner surface between the hanger body axial edge portions, spaced apart from the hanger body circumferential edge portions. The hanger projection comprises at least first and second circumferentially spaced apart hanger bearing surfaces of selected bearing surface shape and facing respectively toward the hanger body first and second circumferential edge portions, for registry with and support of a pair of circumferentially adjacent shroud segments at respective cooperating shroud segment support surfaces. The hanger first bearing surface faces the hanger body first circumferential edge portion and the hanger second bearing surface faces the hanger body second circumferential edge portion opposed to the first hanger bearing surface.

Still another form of the present invention is a turbine engine shroud assembly comprising a plurality of shroud segments and shroud segment hangers. Such shroud segment hangers are assembled about the shroud segments, a shroud segment hanger being between a pair of adjacent shroud segments with its hanger projection axially along and in juxtaposition with an axial interface between the pair of adjacent shroud segments. Each shroud hanger is assembled in registry with the pair of adjacent shroud segments through cooperating respective shroud segment support surfaces and shroud hanger bearing surfaces.

DETAILED DESCRIPTION OF THE INVENTION

Figure 1:
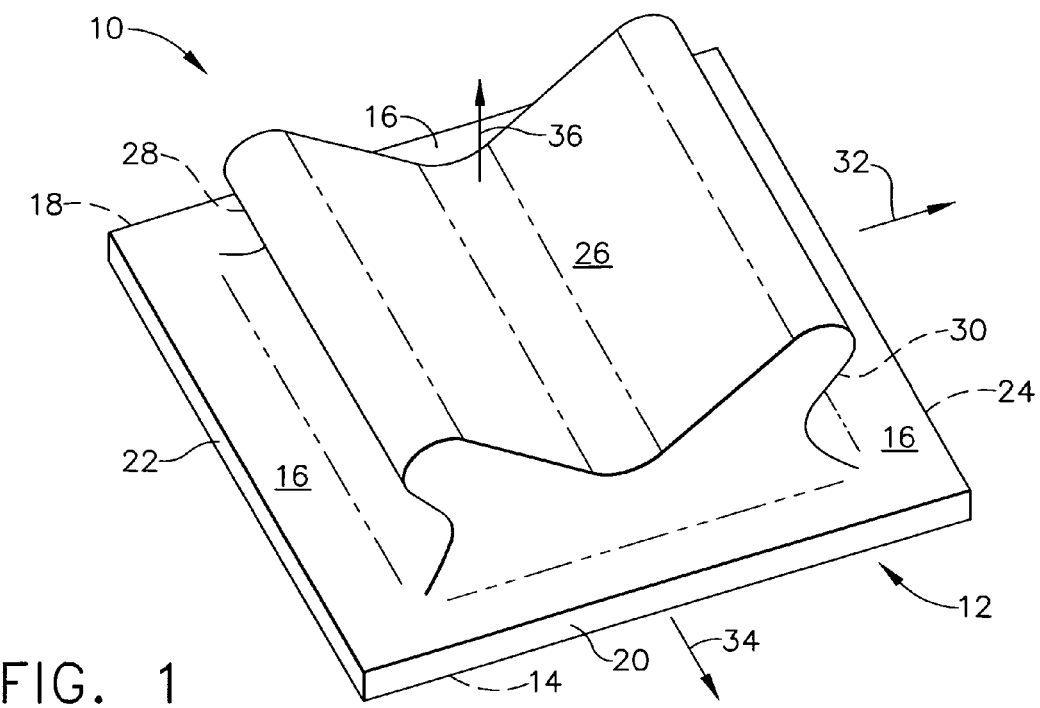
FIG. 1 is a diagrammatic perspective view of a form of a shroud segment according to the present invention.

The present invention will be described in connection with an axial flow gas turbine engine for example of the general type shown and described in the above identified Proctor et al patent. Such an engine comprises, in serial flow communication generally from forward to aft, one or more compressors, a combustion section, and one or more turbine sections disposed axisymmetrically about a longitudinal engine axis. Accordingly, as used herein, phrases using the term "axially", for example "axially forward" and "axially aft", refer to relative positions or directions in respect to the engine axis; phrases using forms of the term "circumferential" refer to circumferential position or direction generally about the engine axis; and phrases using forms of the term "radial", for example "radially inner" and "radially outer", refer to relative radial position or direction generally from the engine axis.

FIGS. 1, 2, 3, 4 and 5 are pictorial-type diagrammatic perspective views of embodiments of a turbine engine shroud segment according to forms of the present invention. Such embodiments enable carrying of a shroud segment, made of the above described low ductility materials such as a CMC, in a turbine engine shroud assembly without application of excessive pressure or force to the shroud segment. A shroud segment shown generally at 10 includes a shroud segment body, shown generally at 12, having a segment body radially inner surface 14 and a segment body radially outer surface 16 spaced apart from radially inner surface 14. Body 12 extends between spaced apart first and second axial edge portions, respectively 18 and 20, and first and second circumferential edge portions, respectively 22 and 24. For carrying the shroud segment, shroud segment 10 includes a shroud segment projection 26, FIG. 1, integral with and extending in a radially outward direction, meaning predominantly radially outward, from shroud body radially outer surface 16. Shroud segment projection 26 comprises at least first and second circumferentially spaced apart shroud segment support surfaces, respectively 28 and 30, of a selected shape, for example substantially planar, and facing toward segment body radially outer surface 16. As used herein, the terms "toward" or "away from" in respect to a surface direction means generally and predominantly in the direction with respect to such surface or member. A segment support surface 28 is shown more clearly in FIG. 5. Shroud segment first support surface 28 faces toward segment body first circumferential edge portion 22, and shroud segment second support surface 30 faces toward segment body second circumferential edge portion 24 in opposition to shroud segment first support surface 28.

Figure 4:
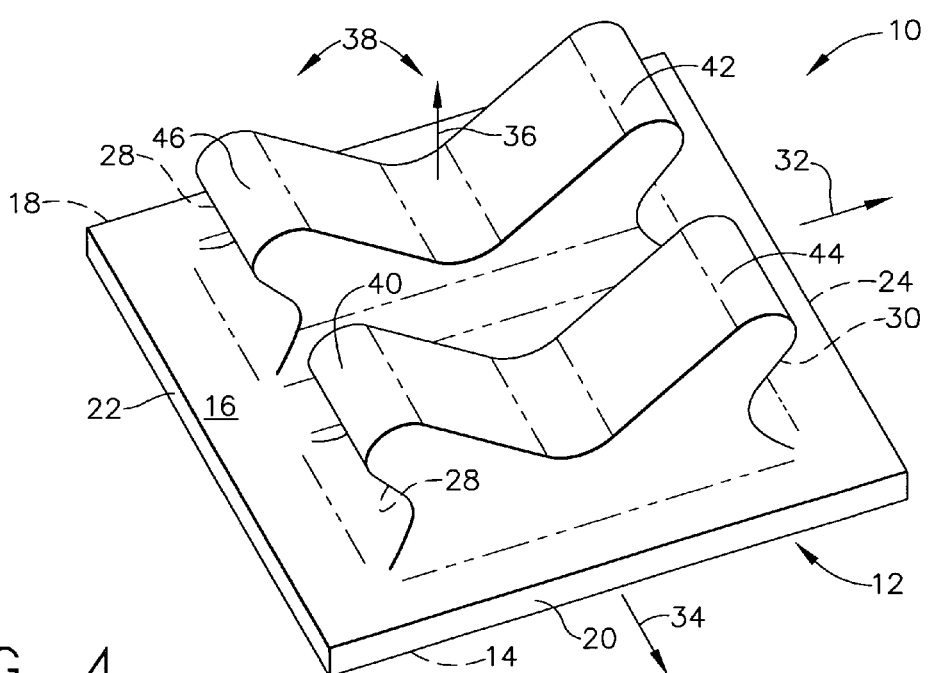
Figure 5:
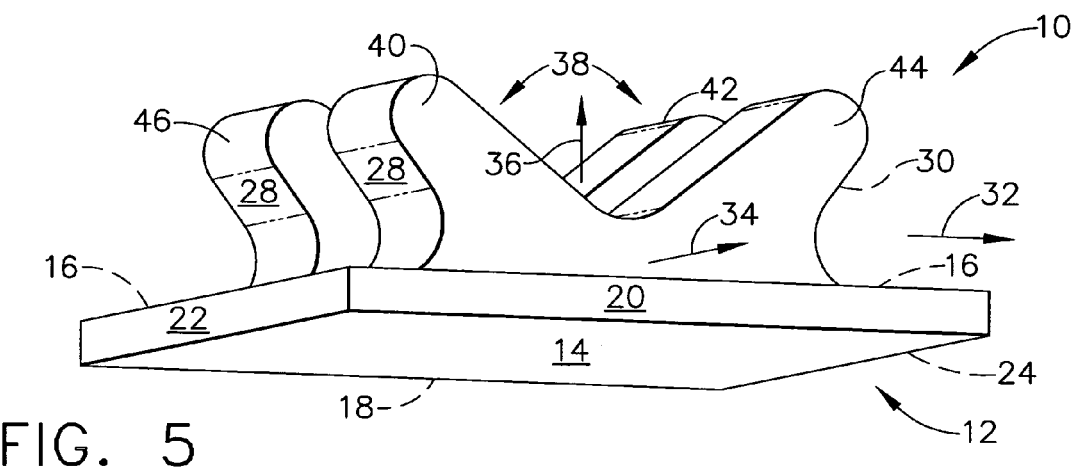
Figure 6:
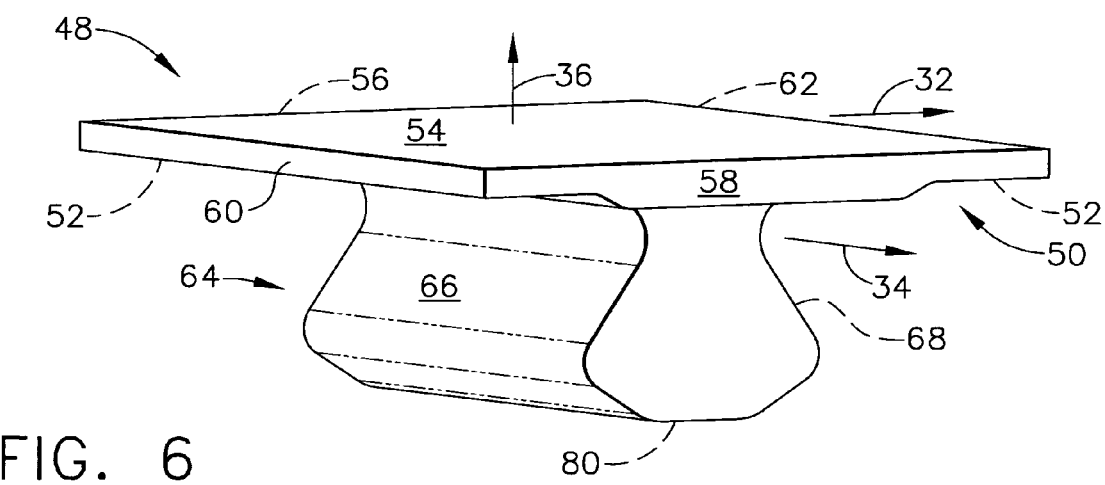
FIG. 6 is a diagrammatic perspective view of a shroud segment hanger according to the present invention.
Figure 7:
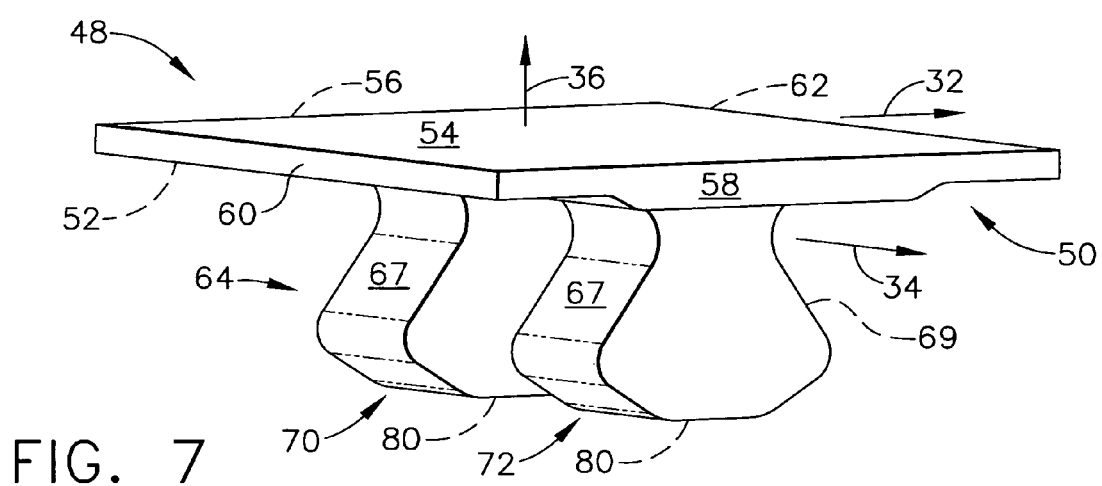
FIG. 7 is a diagrammatic perspective view of a shroud segment hanger, similar to that of FIG. 6, with a segmented hanger projection.

In the drawings, orientation of members of a shroud assembly, for example shroud segments in FIGS. 1–5, and shroud hangers in FIGS. 6–7, are shown by arrows 32, 34 and 36 representing, respectively, the engine circumferential, axial, and radial directions.

Figure 2:
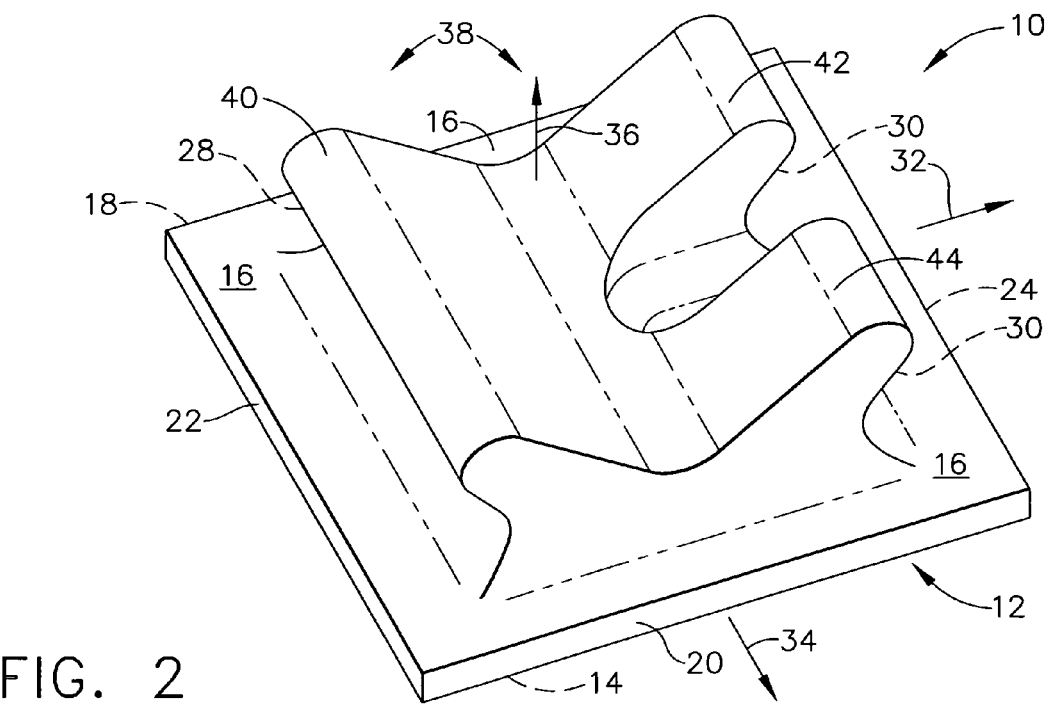
FIGS. 2, 3, 4 and 5 are diagrammatic perspective views of shroud 15 segments similar to the segment of FIG. 1, showing shroud segment support surfaces on a segment projection in the form of an array of projection hooks.
Figure 3:
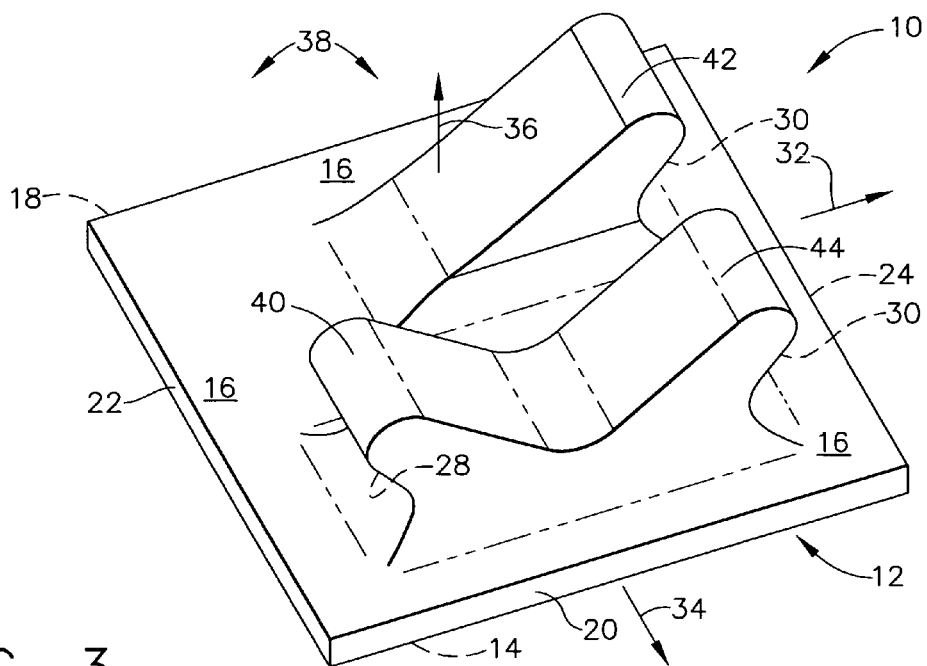

In the embodiments of FIGS. 2, 3, 4 and 5, shroud projection 26 is shown generally at 38 as a projection array. In FIGS. 2 and 3, shroud projection array 38 includes at least three projection hooks 40, 42 and 44; in FIGS. 4 and 5, projection array 38 includes four projection hooks 40, 42, 44 and 46. Projection hook 40, and projection hook 46 in the embodiments of FIGS. 4 and 5, represent a first pair of projection hooks facing toward first circumferential edge portion 22 and including first shroud segment support surfaces 28 facing radially inwardly toward segment body radially outer surface 16. Projection hooks 42 and 44 represent a second pair of projection hooks facing toward second circumferential edge portion 24, in circumferential opposition to projection hooks 40 and 46, and including second shroud segment support surfaces 30 facing radially inwardly toward segment body radially outer surface 16. Each such projection hook is integral with and extends generally radially away from segment body radially outer surface 16.

FIGS. 6 and 7 are diagrammatic perspective views of embodiments of a turbine engine shroud segment hanger shown generally at 48 according to forms of the present invention. Shroud segment hanger 48 can cooperate in a turbine engine shroud assembly to support the above described turbine engine shroud segment without application of excessive force to the shroud segment. Shroud segment hanger 48 comprises a hanger body shown generally at 50, including hanger body radially inner surface 52 and hanger body radially outer surface 54 spaced apart from hanger body radially inner surface 52. Hanger body 50 extends between spaced apart hanger body first and second axial edge portions, respectively 56 and 58, and first and second circumferential edge portions, respectively 60 and 62. Hanger 48 includes a hanger projection, shown generally at 64, extending axially along at least a portion of hanger radially inner surface 52 between hanger body axial edge portions 56 and 58, spaced apart from hanger body circumferential edge portions 60 and 62. In the drawings, hanger projection 64 is positioned axially between hanger body axial edge portions 56 and 58 along a midway portion of hanger body radially inner surface 52, spaced apart from hanger body circumferential edge portions 60 and 62 and conveniently integral with hanger body 50.

Hanger projection 64, shown in an axially segmented embodiment in FIG. 7, comprises at least first and second circumferentially spaced apart and opposed hanger bearing surfaces, respectively 66 and 68, of hanger projection 64 in FIG. 6, and hanger first and second bearing surface portions, respectively 67 and 69, of hanger projection segments 70 and 72 in FIG. 7. The hanger bearing surfaces and hanger bearing surface portions are of a selected surface shape matched for cooperating area registry with a selected shroud segment support surface shape. Conveniently such selected shape is planar as shown in more detail in phantom for hanger bearing surface 66 in FIG. 6 and hanger first bearing surface portion 67 in FIG. 7. For use in a turbine engine shroud assembly, hanger projection 64 can be provided in a number of hanger projection segments 70 and 72, as in FIG. 7, for support of a corresponding number of cooperating shroud segment projection hooks. One example is support of hooks 40 and 46, or hooks 42 and 44, in shroud segment projection array 38 in FIGS. 4 and 5 as described above. Hanger bearing surfaces 66 and 68, and hanger bearing surface segments 67 and 69, face generally radially outwardly, respectively generally toward hanger first and second hanger body circumferential edge portions 60 and 62.

Figure 8:
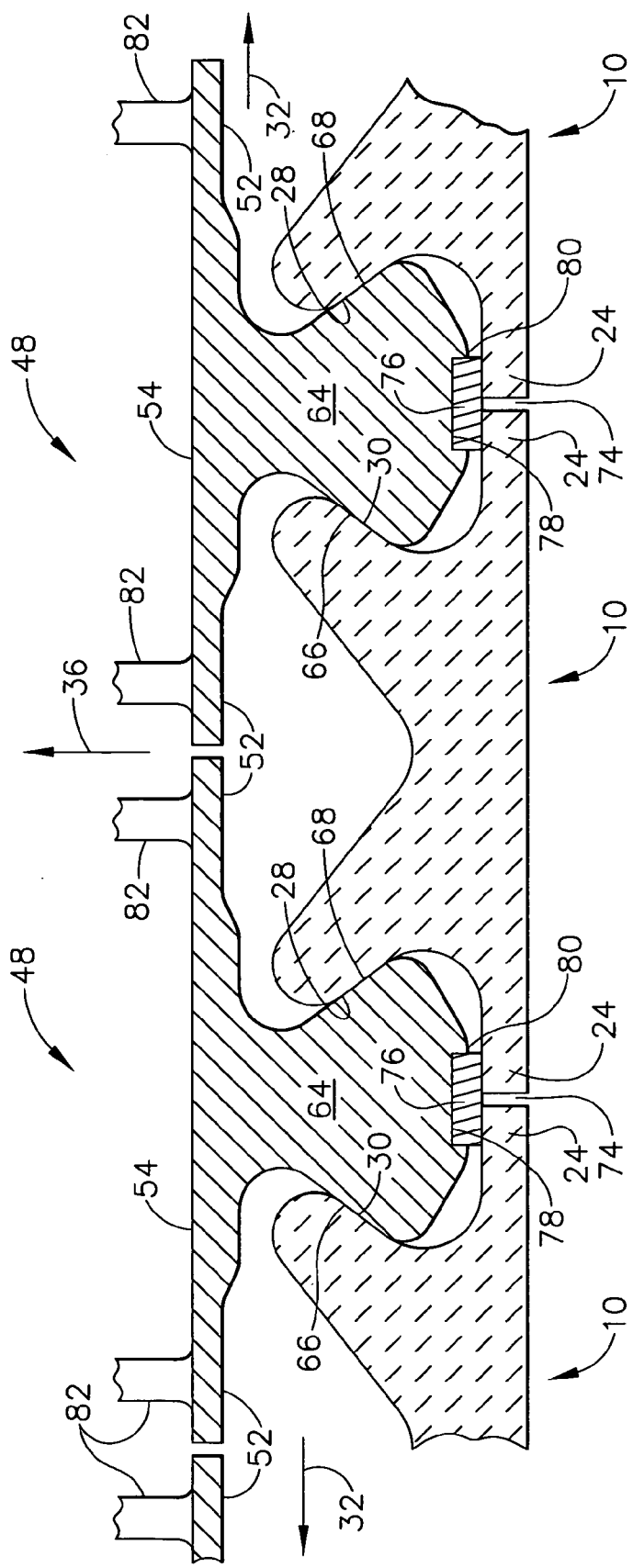
FIG. 8 is a diagrammatic fragmentary, partially sectional axial view of a turbine engine shroud assembly including a plurality of shroud segments and a plurality of shroud segment hangers assembled in circumferential juxtaposition with the shroud hangers in contact with and supporting the shroud segments, in accordance with an embodiment of the present invention.

An example of a turbine engine shroud assembly is shown in the diagrammatic fragmentary partially sectional axial view of FIG. 8. A plurality of shroud segments 10, for example shroud segments as in FIG. 1, is assembled circumferentially; and a plurality of shroud segment hangers 48, for example shroud hangers as in FIG. 6, is assembled circumferentially, radially outwardly about and supporting the shroud segments. Each shroud segment hanger 48, radially outwardly of shroud segments 10, is assembled with a hanger projection 64 between a pair of adjacent shroud segments 10 axially along and in juxtaposition with, in this example radially away from, an axial interface or gap 74 between adjacent shroud segments 10. Hanger bearing surfaces 66 and 68 are for registry with and support of a pair of circumferentially adjacent shroud segments 10 at respective cooperating shroud segment support surfaces 28 and 30. In the embodiment of FIG. 8, hanger bearing surface 66 is in registry with and carries cooperating segment support surface 30, and hanger bearing surface 68 is in registry with and carries cooperating segment support surface 28. In that embodiment, fluid seal 76 is provided radially outwardly of interface 74, for example carried in recess 78 of hanger projection radially inner surface 80. Fluid seal 76, one form of which is a metallic bar seal of a type frequently used in turbine engines, is provided to inhibit radially outward flow or leakage of fluid from a turbine engine flowpath. Also shown in the embodiment of FIG. 8 is hanger support 82 through which hanger 48 is carried by typical turbine engine structure (not shown).

The present invention has been described in connection with specific examples, materials, and structure and assembly combinations. However, it should be understood that they are intended to be representative of rather than in any way limiting on the scope of the present invention. Those skilled in the various arts relating to the design, manufacture and assembly of turbine engines will understand that the invention is capable of variations and modifications without departing from the scope of the appended claims.

What is claimed is:

1. A turbine engine shroud segment comprising a shroud segment body including a segment body inner surface and a segment body outer surface spaced apart from the segment body inner surface, the shroud segment body extending between spaced apart segment body first and second axial edge portions and spaced apart segment body first and second circumferential edge portions, the shroud segment including a segment projection, for carrying the shroud segment body, integral with and projecting away from the segment body outer surface, wherein:
   the segment projection extends axially along at least a portion of the segment body outer surface between the segment body first and second axial edge portions, spaced apart from the segment body first and second circumferential edge portions; and,
   the segment projection comprises at least a segment first support surface and a segment second support surface circumferentially spaced apart from the segment first support surface, each segment support surface being of selected support surface shape, the segment first support surface facing toward the segment body first circumferential edge portion and the segment second support surface facing toward the segment body second circumferential edge portion in opposition to the segment first support surface.

2. The shroud segment of claim 1 in which the shroud segment is made of a low ductility material having a low tensile ductility, measured at room temperature to be no greater than about 1%.

3. The shroud segment of claim 1 in which:
   the segment projection is a projection array comprising at least three discrete projection hooks, each integral with and extending away from the segment body outer surface; and,
   each projection hook is spaced apart from other projection hooks in the projection array along the segment body outer surface and each projection hook faces circumferentially toward a circumferential edge portion.

4. The shroud segment of claim 3 in which:
   at least one of the projection hooks is spaced apart from and faces toward the segment body first circumferential edge portion; and,
   at least one of the projection hooks is spaced apart from and faces toward the segment body second circumferential edge portion.

5. The shroud segment of claim 4 in which:
   the shroud segment is made of a low ductility material having a low tensile ductility, measured at room temperature to be no greater than about 1%; and,
   the selected support surface shape is planar.

6. The shroud segment of claim 4 in which:
   a plurality of projection hooks faces toward the same segment body circumferential edge portion; and,
   the segment support surfaces of the plurality of projection hooks are aligned axially along the segment body outer surface.

7. The shroud segment of claim 6 in which the plurality of projection hooks is four, a first pair of projection hooks with segment support surfaces aligned axially facing toward the segment body first circumferential edge portion, and a second pair of projection hooks with segment support surfaces aligned axially facing toward the segment body second circumferential edge portion.

8. A turbine engine shroud segment hanger comprising a hanger body including a hanger body inner surface and a hanger body outer surface spaced apart from the hanger body inner surface, the hanger body extending between spaced apart hanger body first and second axial edge portions and spaced apart hanger body first and second circumferential edge portions, the shroud segment hanger including a hanger projection extending away from the hanger body inner surface, wherein:
   the hanger projection extends axially along at least a portion of the hanger body inner surface between the hanger body first and second axial edge portions, spaced apart from the hanger body first and second circumferential edge portions; and,
   the hanger projection comprises at least a hanger first bearing surface and a hanger second bearing surface circumferentially spaced apart from the hanger first bearing surface, each hanger bearing surface being of selected hanger bearing surface shape, the hanger first bearing surface facing toward the hanger body first circumferential edge portion and the second hanger bearing surface facing toward the hanger body second circumferential edge portion in opposition to hanger first bearing surface.

9. The shroud segment hanger of claim 8 in which the hanger projection is integral with the hanger body and is positioned at a midway portion of the hanger body inner surface between the hanger body first and second circumferential edge portions.

10. The shroud segment hanger of claim 8 including a hanger support integral with and extending away from the hanger body.

11. The shroud segment hanger of claim 8 in which:
    the hanger projection comprises a plurality of axially spaced apart hanger projection segments aligned substantially axially along the hanger body inner surface;
    each hanger projection segment including a first and a second circumferentially spaced apart hanger bearing surface opposed one to the other.

12. The shroud segment hanger of claim 8 in which the hanger projection includes a surface having therein a seal recess.

13. The shroud segment hanger of claim 12 in which the seal recess includes a distinct fluid seal therein.

14. A turbine engine shroud assembly comprising a plurality of shroud segments assembled circumferentially and a plurality of shroud segment hangers assembled circumferentially about and supporting the shroud segments, wherein:
    the plurality of the shroud segments each is the turbine engine shroud segment of claim 1 with circumferential segment body edge portions of adjacent shroud segments in circumferential juxtaposition across an interface extending toward the axial direction;
    the plurality of the shroud segment hangers each includes a hanger projection with spaced apart hanger bearing surfaces, the hanger projection extending toward the interface between the shroud segments;
    the plurality of shroud segment hangers are assembled with a hanger projection between a pair of adjacent shroud segments and each hanger projection axially along and in juxtaposition with each interface between the pair of adjacent shroud segments; and,
    each shroud segment hanger is assembled in registry with the pair of adjacent shroud segments through cooperating respective segment support surfaces and hanger bearing surfaces.

15. The turbine engine shroud assembly of claim 14 in which:
    the segment projection of at least one shroud segment is a projection array comprising at least three discrete projection hooks, each integral with and extending away from the segment body outer surface; and, each projection hook of a shroud segment is spaced apart from other projection hooks along the segment body outer surface, and each projection hook faces circumferentially toward a segment body circumferential edge portion and an interface between adjacent shroud segments.

16. The turbine engine shroud assembly of claim 15 in which:

a plurality of projection hooks in the projection array faces toward the same segment body circumferential edge portion and toward the interface between adjacent shroud segments, each of the plurality of projection hooks including a segment support surface portion spaced apart and aligned substantially axially one with another; and, the hanger projection assembled for registry with the segment support surface portions of the plurality of projection hooks comprises a plurality of axially aligned hanger projection segments of a number corresponding to the plurality of projection hooks, each of the plurality of hanger projection segments including a hanger bearing surface portion spaced apart and aligned substantially axially and in registry with a cooperating segment support surface portion.

\* \* \* \* \*